United States Patent
Beier (10) Patent No.: US 7,106,739 B2
(45) Date of Patent: Sep. 12, 2006

(54) METHOD ENABLING NETWORK ADDRESS TRANSLATION OF INCOMING SESSION INITIATION PROTOCOL CONNECTIONS BASED ON DYNAMIC HOST CONFIGURATION PROTOCOL ADDRESS ASSIGNMENTS

(75) Inventor: Niels Beier, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 09/892,932

(22) Filed: Jun. 27, 2001

(65) Prior Publication Data

US 2003/0002496 A1    Jan. 2, 2003

(51) Int. Cl.
*H04L 12/28* (2006.01)
*H04L 12/56* (2006.01)
(52) U.S. Cl. ........................................ 370/392; 370/401
(58) Field of Classification Search ..................... None
See application file for complete search history.

(56) References Cited

U.S. PATENT DOCUMENTS

| | | | |
|---|---|---|---|
| 6,029,203 A | | 2/2000 | Bhatia et al. |
| 6,108,701 A | * | 8/2000 | Davies et al. ............... 709/224 |
| 6,195,705 B1 | * | 2/2001 | Leung ......................... 709/245 |
| 6,614,800 B1 | * | 9/2003 | Genty et al. ................. 370/464 |

OTHER PUBLICATIONS

Srisuresh, P. et al.: "DNS Extensions To Network Address Translators (DNS_ALG)" Internet Draft, Jul. 1998, XP002199933.
Tsuchiya, P. et al.: "Extending The IP Internet Through Address Reuse" Computer Communications Review, Association for Computing Machinery, New York, US, vol. 1, No. 23, 1993, pp. 16-33, XP002075152.
Droms, R.: "RFC2131: Dynamic Host Configuration Protocol" Request for Comments, Mar. 1997, XP002168114.

* cited by examiner

*Primary Examiner*—Chau Nguyen
*Assistant Examiner*—Cynthia L. Davis
(74) *Attorney, Agent, or Firm*—Pillsbury Winthrop Shaw Pittman LLP

(57) ABSTRACT

A system for using Dynamic Host Configuration Protocol (DHCP) address assignments to determine a local destination address of a received packet in a Network Address Translation (NAT) environment. The system includes a DHCP server to assign local IP addresses to devices on a network. The system has a NAT device to execute network address translation, and a packet device to receive packets. The system further includes an addressing device to determine the local destination address of a packet received by the packet device. The addressing device uses an association table created from symbolic names of the devices on the network and the local IP addresses associated with the devices.

22 Claims, 7 Drawing Sheets

METHOD ENABLING NETWORK ADDRESS TRANSLATION OF INCOMING SESSION INITIATION PROTOCOL CONNECTIONS BASED ON DYNAMIC HOST CONFIGURATION PROTOCOL ADDRESS ASSIGNMENTS

BACKGROUND OF THE INVENTION

1. Field of the Invention

This invention relates to the field of network address assigning, and, more specifically, to a system, method, and apparatus for enabling Network Address Translation (NAT) of incoming Session Initiation Protocol (SIP) connections based on Dynamic Host Configuration Protocol (DHCP) address assignments.

2. Background of the Invention

Local area networks (LANs) have been used with network devices such as personal computers. A LAN typically has a set number of unique Internet Protocol (IP) addresses for all of the devices on the LAN. More specifically, multiple computers on the LAN may be represented by the same IP address and use the same router(s). In such embodiments, there may be 10 computers, for example, assigned to one router, where the router has its own unique IP address.

In such a LAN, Network Address Translation (NAT) allows a single device, such as a router, to act as an agent between the Internet, or "public network", and a local, or "private", network. This means that only a single, unique IP address is required to represent an entire group of computers.

In such an embodiment, a major problem with using NAT is to locate the correct device on the internal network when a packet from the Internet arrives at the router, because all packets received from the Internet are addressed to the router and not to the devices behind the router. Configuring static mappings in the router can, in some cases, solve the problem. For example, the router may be configured to send all World Wide Web (WEB) traffic to a specific PC behind a router, and send all File Transfer Protocol (FTP) traffic to a different specified PC behind the router. However, the problem with this type of static mapping is that it requires specific configuration of the router, which may be expensive for an ISP shipping thousands of routers. Moreover, it is problematic if several PCs are performing the same service (FTP, WEB, etc.).

When a connection is initiated from a device on the internal network to an external device, the access device can always establish the NAT mapping without the use of any additional information. However, when using NAT, connections may only be made from inside a local network to a location outside of the network. A device outside the network cannot connect to a device on the local network without the router being specifically configured to do so. Therefore, the prior art suffers from a serious inefficiency in that a connection cannot be initiated with a device on a LAN by a device outside the LAN without specific configuration of the router at the LAN.

DETAILED DESCRIPTION

An embodiment of the present invention includes a device that simultaneously acts as a Dynamic Host Configuration Protocol (DHCP) server and a Network Translation Address (NAT) apparatus. The device may be used within an access router connected to the Internet. Such a device routes incoming packets to devices on a network based upon symbolic names acquired by a DHCP program running on the DHCP server. The device allows an incoming Session Initiation Protocol (SIP) Internet Protocol (IP) call originating from the Internet to be routed to the correct device on the Local Area Network (LAN) segment that uses a private IP address.

DHCP is a software program that automatically assigns IP addresses to client stations logging onto an IP network. It eliminates the need to manually assign permanent IP addresses. DHCP software typically runs on servers and is also found in network devices such as Integrated Services Digital Network (ISDN) routers and modem routers that allow multiple users access to the Internet. NAT is an Internet Engineering Task Force (IETF) standard that allows an organization to present itself to the Internet with one address. NAT converts the address of each LAN node into one IP address for the Internet and vice versa. It also serves as a firewall by keeping individual IP addresses hidden from the outside world. SIP is a protocol that provides IP telephony services, such as realtime, interactive voice and videoconferencing over LANs and the Internet. It allows any combination of voice, video and data to be transported.

Figure 1:
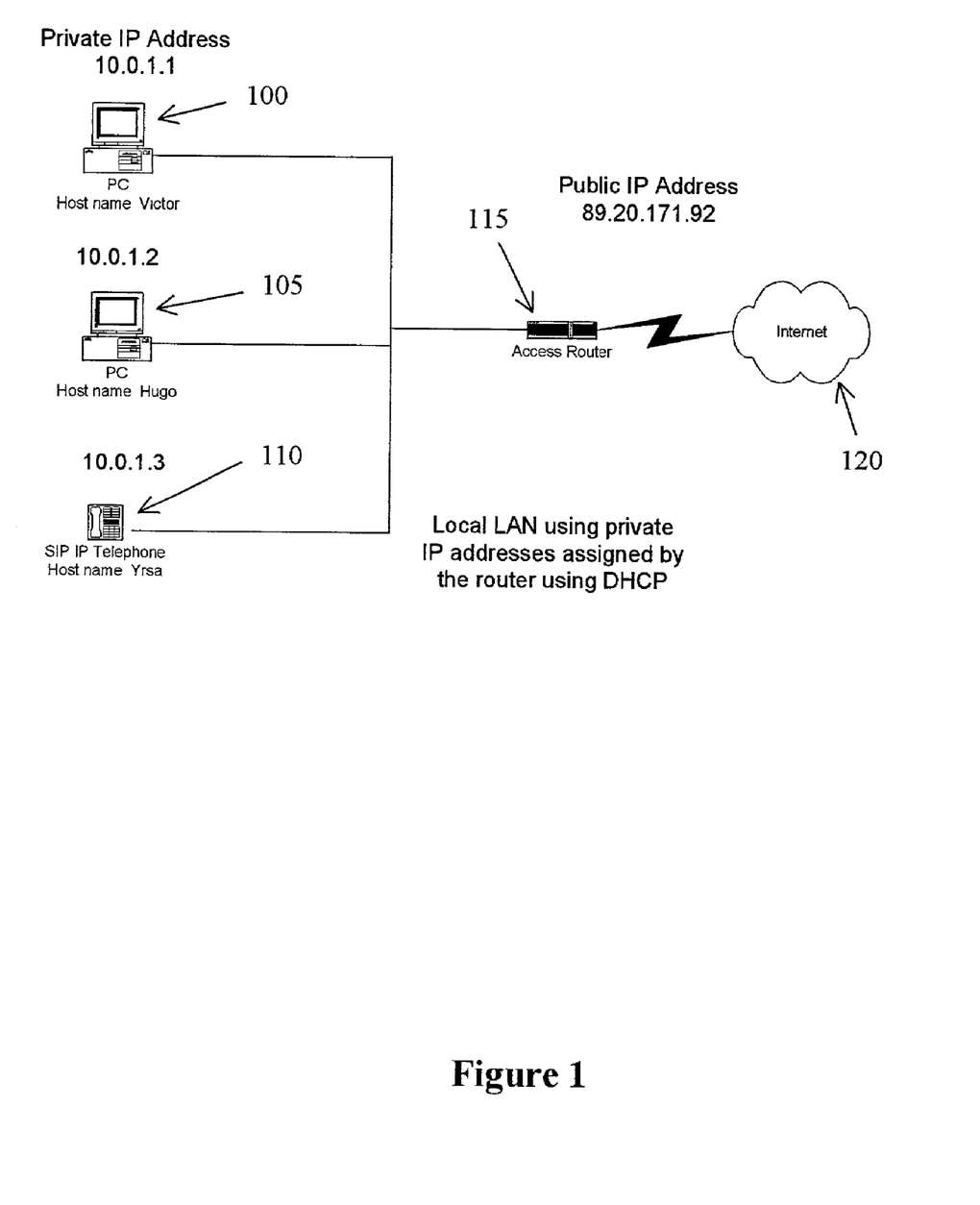
FIG. 1 illustrates a general overview of a system according to an embodiment of the invention.

FIG. 1 illustrates a general overview of the system according to an embodiment of the invention. In an embodiment of the invention, a number of devices are coupled to an access router 115 capable of transmitting and receiving data via the Internet. FIG. 1 illustrates an embodiment where a first computer 100, a second computer 105, and a SIP IP telephone 110 all reside on a LAN connected to the router 115. The first computer 100 has a host name, or symbolic name, "Victor." The second computer 105 has a symbolic name "Hugo." The SIP IP telephone 110 has the symbolic name "Yrsa."

The first computer 100, the second computer 105, and the SIP IP telephone 110 are all connected to the access router 115, which serves as the pathway for communication between them and destinations on the Internet 120. For the first computer 100 to send data to a destination address on the Internet, the first computer 100 must send a packet to the router 115, which then sends the packet to the destination address on the Internet 120.

In order for a device on the LAN to receive packets of data from a site on the Internet, the router 115 must be configured to route certain packets to a particular device. In other words, the router 115 must extrapolate, from a received packet, the destination address of the packet. To determine which packets must be routed to which devices on the LAN, the router 115 typically has to have prior knowledge about each of the devices.

To receive and transmit packets over the LAN, or to an Internet site outside of the LAN, a device must have an IP address. As shown in FIG. 1, the first computer 100 has the "private" IP address 10.0.1.1., the second computer 105 has the private IP address 10.0.1.2, and the SIP IP telephone 110 has the private IP address 10.0.1.3. A private IP address is an IP address that is not known or directly accessible by a device outside the LAN. In this example, the access router 115 has the "public" IP address 89.20.171.92. A public IP address is accessible by a device inside or outside the LAN. Whenever a packet is sent to the LAN from a destination on the Internet 120, the packet is sent to the router's 115 public IP address. Once received, the router 115 may then transmit the packet to the local IP address of one of the devices on the LAN.

In an embodiment of the invention, a variable number of devices may be hooked up to a router 115 over the LAN. For a device to transmit and receive data from outside the network, the device may be assigned a local IP address. A router 115 may be utilized to assign IP addresses to devices on the LAN. To assign a device a local IP address, the device may send an IP address request to the router 115, which then assigns a local IP address to the device. Each time a device is powered down, and then powered back up, it may be assigned an IP address that need not necessarily be identical to the IP address assigned to the device before being powered down. DHCP is a program, executable by a router 115, that may be used to assign a local IP address to a device on the LAN.

Figure 2:
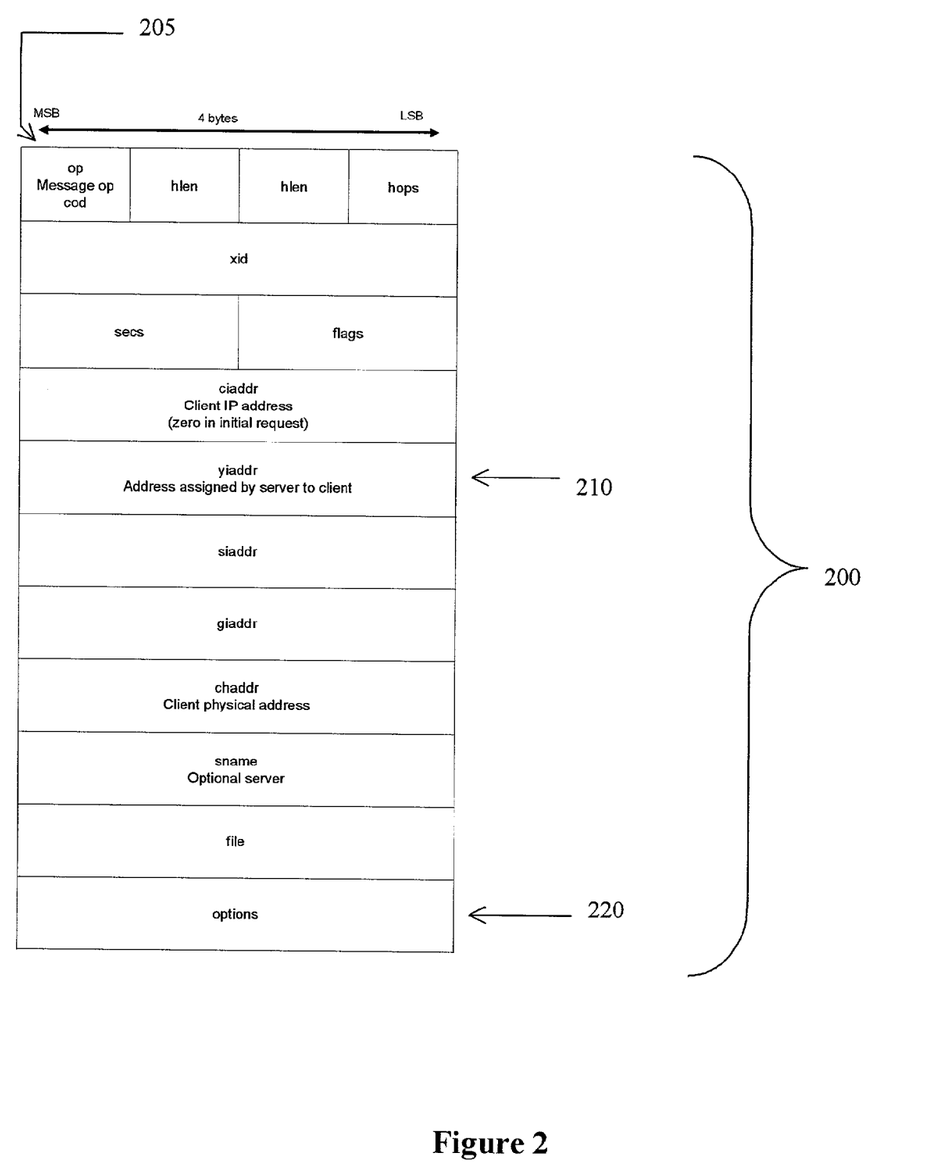
FIG. 2 illustrates a basic DHCP packet according to an embodiment of the invention.

FIG. 2 illustrates a basic DHCP packet 200 according to an embodiment of the invention. When a device on the network sends an IP address assignment request to the router 115, the request is in the form of a DHCP packet 200. The packet contains various fields of information, such as operation (op) code 205. Op code 205 is used to signify whether the packet is a request for an IP address or an assignment of an IP address. If an IP address request is sent, the op code 205 for the DHCP packet is set to "1". A DHCP server, which may be located at the router 115, responds to the request by sending a DHCP packet with op code 205 set to "2".

In the DHCP response, the IP address assigned to client is stored in the "yiaddr" field 210. Although a basic DHCP packet 200 does not contain the client name, most clients include an optional field in the "options" field 220 of the DHCP request packet 200.

Figure 3:
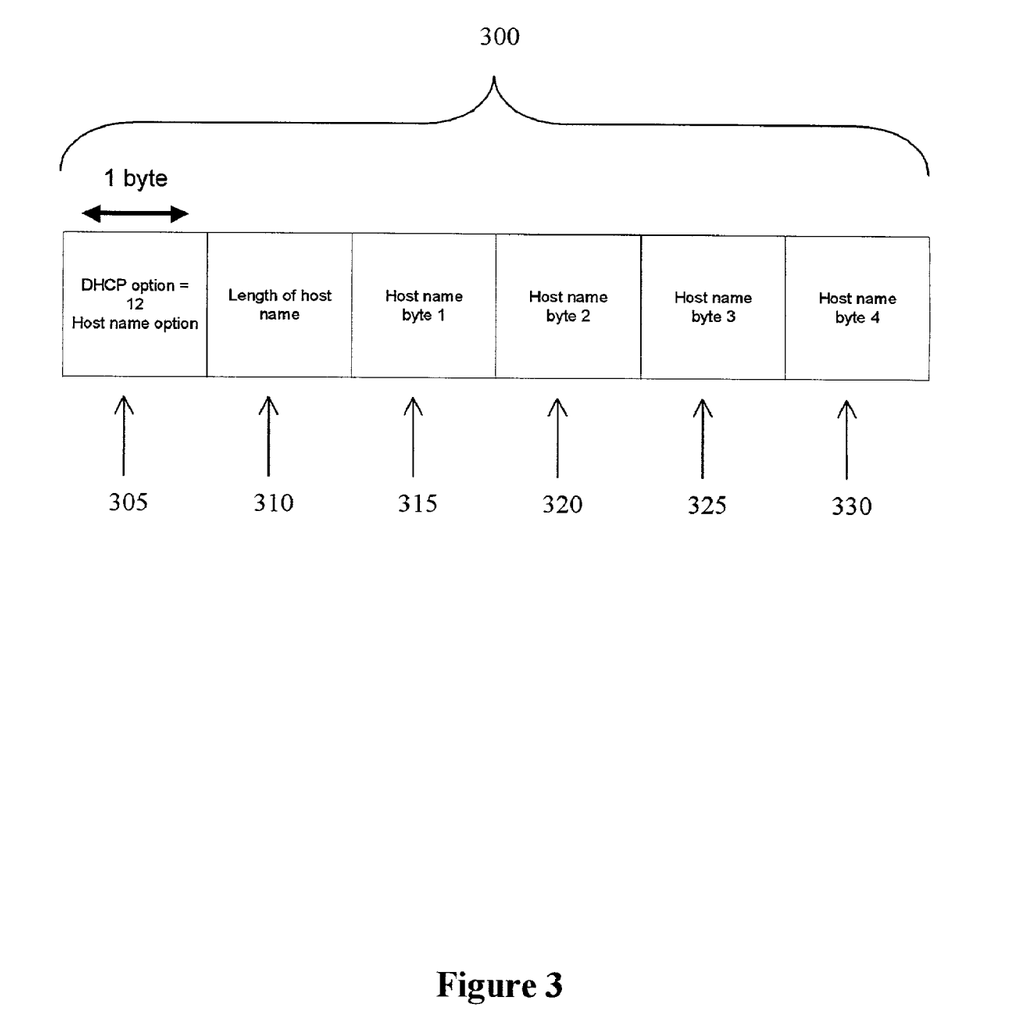
FIG. 3 illustrates an additional option field portion of a DHCP packet according to an embodiment of the invention.

FIG. 3 illustrates an additional host option field 300 portion of a DHCP packet according to an embodiment of the invention. The host option field 300 is utilized to store the symbolic name of a device requesting an IP address. The host option field 300 is located in the options field 220 of the DHCP request packet 200. The host option field 300 is comprised of a plurality of bytes. The first byte 305 represents the DHCP option code for the option field. A DHCP option code of "12" represents the host name option. The second byte 310 represents the length of the host name. FIG. 3 shows the bytes in which a host name having four characters may be stored. The first byte 315, the second byte 320, the third byte 325, and the fourth byte 330 may be stored in consecutive bytes in the host option field 300. In the event that the symbolic name "Victor" were to be stored in the host option field 300, the second byte would be set to "6", the length of the host name. There would then be "6" bytes in which one of the letters of the name would be stored, respectively.

In an embodiment of the invention, the router 115 does not have any information concerning the name of any devices on the LAN before those devices send an IP address request. When the router 115 receives an IP address request in the form of a DHCP packet, the router 115 takes the symbolic name of the device from the host option field 300, assigns the IP address, and maintains a table in which the assigned IP address is associated with the symbolic name of the device. For example, if the DHCP server assigns the local IP address 10.0.1.1 to the device having the symbolic name "Victor", the table will associate the name "Victor" with the local IP address 10.0.1.1.

Figure 4:
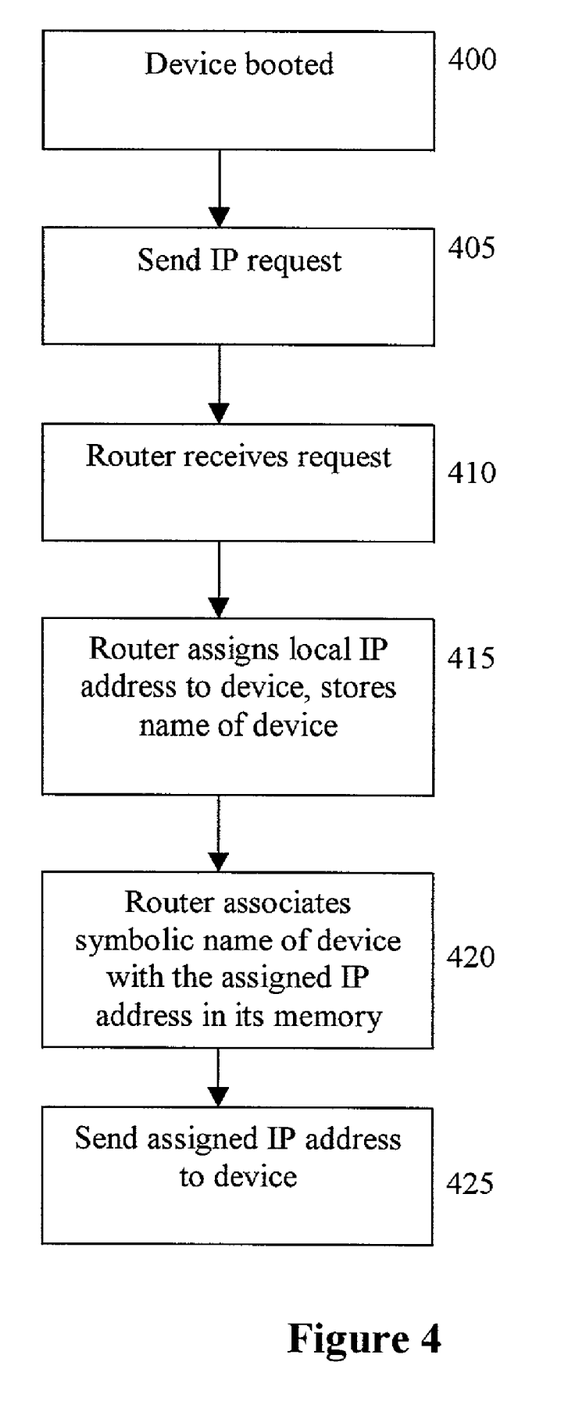
FIG. 4 illustrates a process by which a device is assigned a local IP address according to an embodiment of the invention.

FIG. 4 illustrates a process by which a device is assigned a local IP address according to an embodiment of the invention. First, the device is booted 400. Next, the device sends 405 an IP request to the DHCP server. The DHCP server is typically located at the router 115. The device need not have knowledge of the location of the DHCP server when booted. In an embodiment of the present invention, a device may be booted, and then may send a DHCP packet 200 requesting an assignment of an IP address to all devices on the LAN. The device having the DHCP server will receive a DHCP packet 200, assign an IP address to the device, and send a DHCP response packet to the device. The DHCP response packet contains the local IP address assigned to the device.

Next, at step 410, the DHCP server receives the IP request. The DHCP server then assigns 415 a local IP address to the device, and stores the symbolic name of the device in memory. The symbolic name of the device is associated 420 with the assigned IP address and is then stored in memory. Finally, a DHCP response packet having the assigned IP address is sent 425 to device.

An embodiment of the present invention uses a table of symbolic names and assigned local IP addresses to route incoming packets to devices on the LAN. Referring to FIG. 1, the first computer 100 has a symbolic name Victor. When the first computer 100 initially boots, it sends a DHCP IP address request packet to the DHCP server at the router 115. The router 115 then assigns the first computer 100 a local IP address. In this case, the local IP address is "10.0.1.1". If a packet is received, from outside the LAN, by the router 115 and is addressed to "Victor" at the public IP address "89.20.171.92", the router 115 uses the association table to determine which device on the LAN has the symbolic name "Victor." In such an instance, the packet would be received by the router 115 and sent to the first computer 100.

Figure 5:
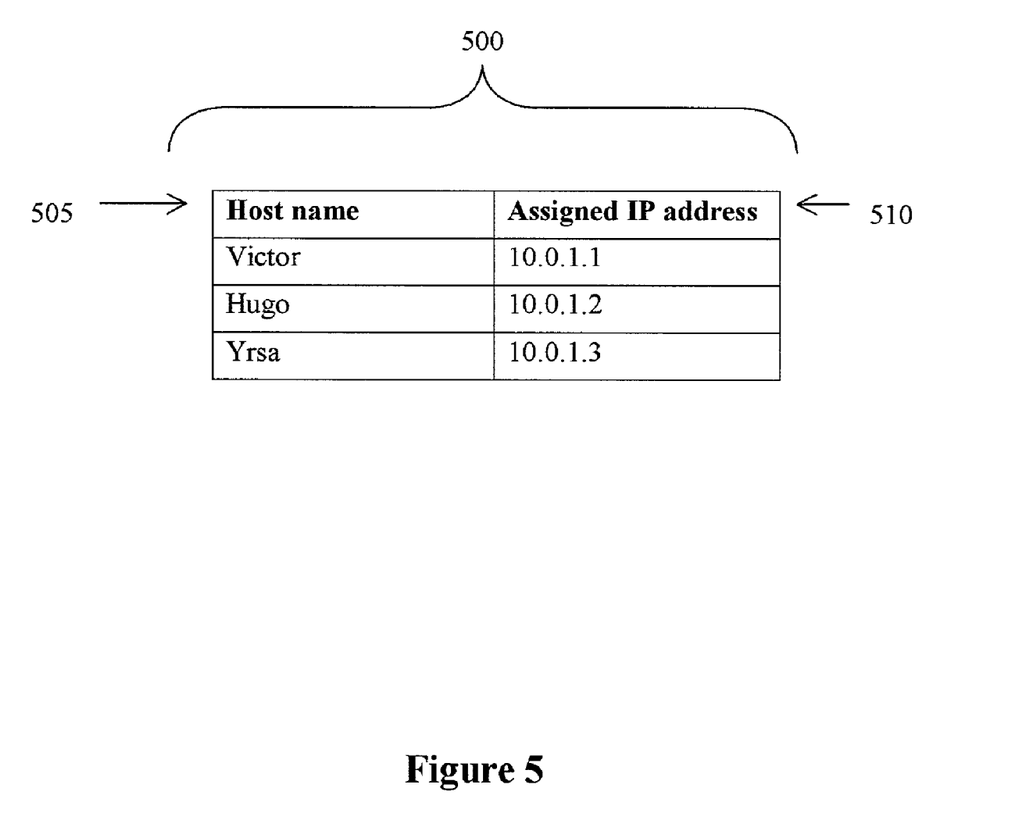
FIG. 5 illustrates an association table according to an embodiment of the present invention.

FIG. 5 illustrates an association table 500 according to an embodiment of the present invention. After all of the devices on the LAN illustrated in FIG. 1 have been assigned local IP addresses, the association table 500 for the LAN is complete. The association table 500 has a "Host Name" column 505 and an "Assigned IP address" column 510. For the LAN illustrated in FIG. 1, the host names are "Victor", "Hugo", and "Yrsa", and the assigned IP addresses are "10.0.1.1", "10.0.1.2", and "10.0.1.3", respectively.

When a packet is sent from a device on the LAN to the router 115, and then to a destination on the Internet, the device sends a packet with the device's local IP address and port number. The IP address is utilized to identify the device, and the port number indicates the service on the device. For example, if the IP address "100.100.100.100" is an HTTP server, its port number is "80", the industry standard port number for HTTP. If it is a Telnet server, its port number is "23", the industry standard port number for Telnet.

An embodiment of the present invention may use NAT to present the entire LAN, and all devices located thereon, as having only the public IP address of the router 115. In the example illustrated in FIG. 1, the public IP address of the LAN is "89.20.171.92", the IP address of the router 115. All packets received by the network, but meant for any of the devices on the LAN, are addressed to the public IP address of the router 115. Therefore, the router 115 is configured to route packets to particular devices on the LAN. If the second computer 105, with the symbolic name "Hugo", initiates a connection to an IP address on the Internet, such as "95.10.1.5", the router 115 creates a NAT session entry for second computer 105. The entry contains an instruction that traffic from 95.10.1.5 sent to public IP address 89.20.171.92 should be forwarded to 10.0.1.2. Also, packets sent from 10.0.1.2 are altered to contain the public IP address 89.20.171.92 as the source IP address. So when a packet from the address 95.10.1.5 arrives from the Internet, the router 115 uses the stored NAT entry and forwards the packet to 10.0.1.2.

When a packet is sent from a device on the network to a device on the Internet outside the network, the packet contains a source IP address and port number, and a destination IP address and port number. If the first computer 100, "Victor", sends a packet destined for a HTTP server at the IP address "100.100.100.100", the packet would contain the source IP address "10.0.1.1" and a source port number. The source port number is chosen by the first computer 100. For example, the first computer may assign the port number "1050" as the source port. The destination IP address is "100.100.100.100" and the destination port number is "80". When the router 115 receives the packet, it first verifies that no other devices on the LAN are already using the source port "1050". If any other devices are using that port number, the router assigns a new source port number to the packet. Also, the router 115 changes the source IP address from 10.0.0.1 to the public IP address of the router, "89.20.171.92".

Figure 6:
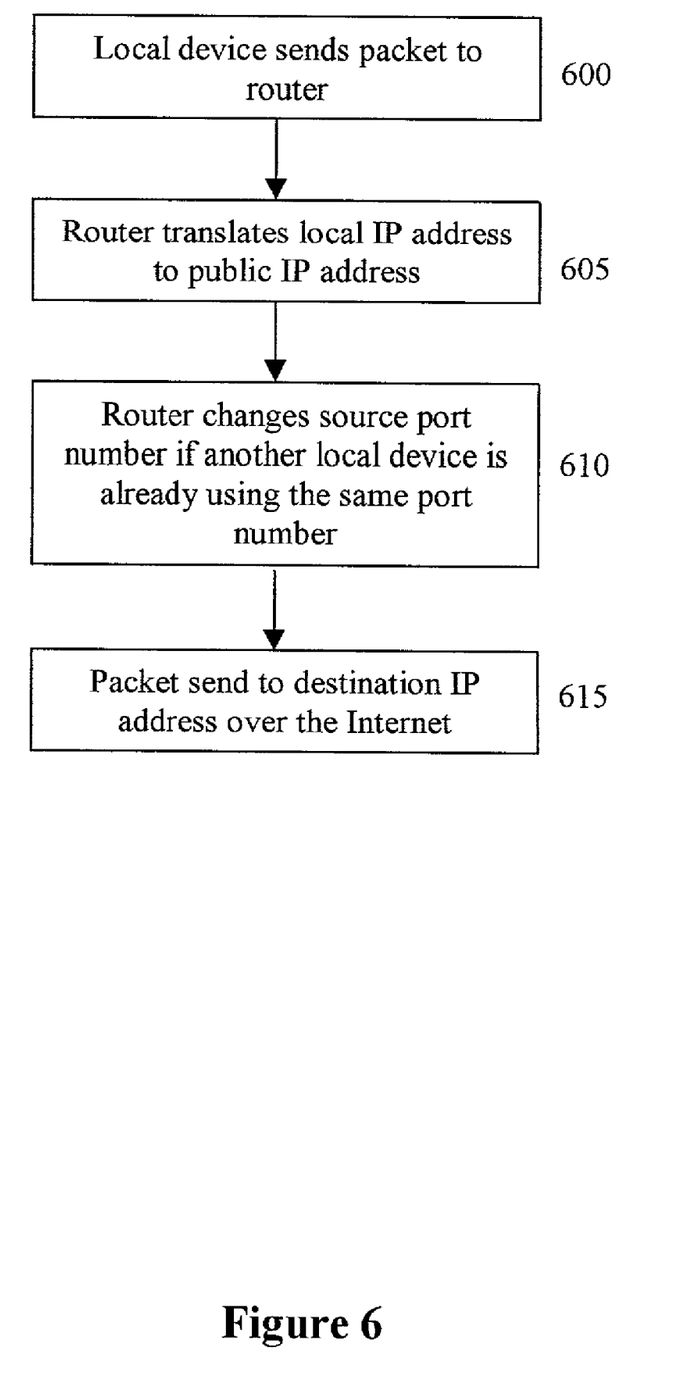
FIG. 6 illustrates a process by which a packet is sent from a local device to a destination address on the Internet according to an embodiment of the present invention.

FIG. 6 illustrates a process by which a packet is sent from a local device to a destination address on the Internet according to an embodiment of the present invention. First, the local device sends 600 a packet to the router 115. The packet contains a source local IP address and port number, and a destination IP address and port number. Next, the router 115 translates 605 the local IP address to the public IP address. More specifically, the router 115 removes the local IP address from the packet and inserts the public IP address. In the embodiment illustrated in FIG. 1, the public IP address "89.20.171.92" would be inserted into the packet. The router 115 then changes 610 the source port number in the packet if another local device is already using the same source port number. Finally, the router 115 sends 615 the packet to the destination IP address over the Internet.

When a connection is not initiated by a device on the LAN, the router 115 is configured to send a received packet to the correct device on the LAN. In an embodiment of the present invention, the system uses the association table 500 to determine which local device to route an incoming packet. For example, an incoming packet may have the symbolic name of the destination device stored in the packet payload of the incoming packet. The system can then extract the symbolic name from the packet, determine the local IP address from the association table 500, and route the packet to the correct local device. For example, in the embodiment shown in FIG. 1, a packet sent the public IP address "89.20.171.92" addressed to the symbolic name "yrsa@89.20.171.92" would be routed to the local IP address "10.0.1.3", which corresponds to the symbolic name "Yrsa". An SIP IP telephone connection can therefore be initiated by a device outside the LAN by addressing a packet to the public IP address of the router 115, and including the symbolic name "yrsa@89.20.171.92" in the packet payload.

Figure 7:
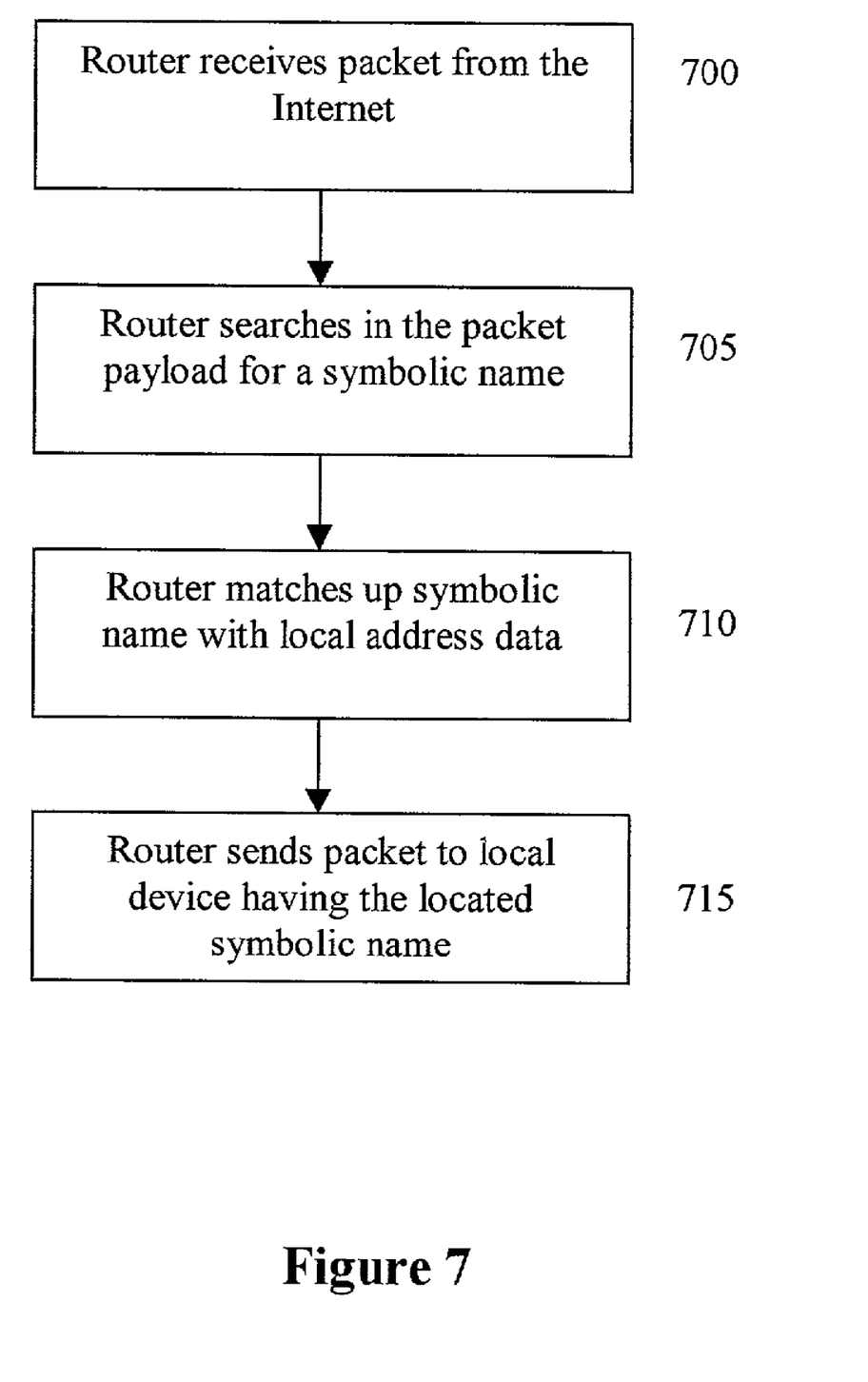
FIG. 7 illustrates a process by which packets are received and routed to the destination device on a local network.

FIG. 7 illustrates a process by which packets are received and routed to the destination device on a local network. First, the router 155 receives 700 a packet from a remote location on the Internet. Next, the router 115 searches 705 in the packet payload for a symbolic name address. The router 115 utilizes the association table 500 to match 710 the symbolic name with an associated local IP address, if there is one. Finally, the router 115 sends 715 the packet to the local device having the located symbolic name.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A system for using Dynamic Host Configuration Protocol (DHCP) address assignments to determine a local destination address of a received packet in a Network Address Translation (NAT) environment, the system comprising:
   a DHCP server to assign local Internet Protocol (IP) addresses to devices on a local network in response to an IP address request in the form of a DHCP packet sent by a device on the local network, the request packet containing in the options field a symbolic name of the device;
   a remote network, wherein the local IP addresses on the local network are not directly accessible to devices on the remote network;
   a NAT device to translate addresses from the remote network to the local network;
   a packet device to:
      receive packets from the remote; and
      receive packets from the devices on the local network, configured such that when it receives packets from devices on the local network, the packet device:
         changes a source IP address of the packet from the IP address of the device on the local network to the IP address of the packet device, and
         verifies that no other devices on the local network are already using the source port, and if another device is using the source port, the packet device assigns a new source port to the packet;
   an addressing device to determine the local destination address of the packets received by the packet device, wherein the addressing device uses an association table created from symbolic names of the devices on the local network and the local IP addresses associated with the devices, and the addressing device determines a symbolic name of a destination address of a device from the packet, utilizes the association table to determine the destination address of the packet by correlating the symbolic name of the device with the device's assigned IP address, and routes the packet to the destination address.

2. The system of claim 1, wherein the packet device is a router.

3. The system of claim 2, wherein the DHCP server is located at the router.

4. The system of claim 2, wherein the NAT device is located at the router.

5. A method of using Dynamic Host Configuration Protocol (DHCP) address assignments to determine a local destination address of a received packet in a Network Address Translation (NAT) environment, the method comprising:
assigning local Internet Protocol (IP) addresses to devices on a local network in response to an IP address request in the form of a DHCP packet sent by a device on the local network, the request packet containing in the options field a symbolic name of the device;
receiving packets from a remote network, where the local IP addresses are not directly accessible to devices on the remote network;
receiving packets from the devices on the local network, and changing a source IP address of the packet from the IP address of the device on the local network to the IP address of a packet device that receives packets from the devices on the local network, and verifying that no other devices on the local network are already using the source port, and if another device is using the source port, assigning a new source port to the packet;
executing translation of addresses sent from the remote network to the local network;
using an association table created from symbolic names of the devices on the local network and the local IP addresses associated with the devices;
determining the local destination address of the received packets by correlating the symbolic names of the devices with the devices' assigned IP addresses;
determining a symbolic name of a destination address of a device from the packets;
utilizing the association table to determine the destination address of the packets; and
routing the packets to the destination address.

6. The method of claim 5, wherein a router receives the packets.

7. The method of claim 6, wherein the router includes a DHCP server.

8. The method of claim 6, wherein the router includes a NAT device.

9. The method of claim 5, wherein the remote network is an Internet.

10. An apparatus for using Dynamic Host Configuration Protocol (DHCP) address assignments to determine a local destination address of a received packet in a Network Address Translation (NAT) environment, the apparatus comprising:
a name acquisition device to determine symbolic names of devices on a local network;
an address acquisition device to determine local Internet Protocol (IP) addresses of the devices on the local network, wherein the local P addresses are not directly accessible to devices outside the network, and wherein the IP addresses are assigned to devices on the local network by a DHCP server in response to an IP address request in the form of a DHCP packet sent by a device on the local network, the request packet containing in the options field a symbolic name of the device;
a packet device to;
receive packets from the remote network; and
receive packets from the devices on the local network, configured such that when it receives packets from devices on the local network, the packet device:
chances a source IP address of the packet from the IP address of the device on the local network to the IP address of the packet device, and
verifies that no other devices on the local network are already using the source port, and if another device is using the source port, the packet device assigns a new source port to the packet;
a data transfer device to transfer data to a packet receiving device; an addressing device to determine the local destination address of the packet received by the packet device, wherein the addressing device uses an association table created from the symbolic names of the devices on the local network and the local IP addresses associated with the devices; and the addressing device determines a symbolic name of a destination address of a device from the packet, utilizes the association table to determine the destination address of the packet by correlating the symbolic name of the device with the device's assigned IP address, and routes the packet to the destination address.

11. The apparatus of claim 10, wherein the packet receiving device is a router.

12. The apparatus of claim 11, wherein a DHCP server is located at the router.

13. The apparatus of claim 11, wherein a NAT device is located at the router.

14. A system for initiating an Internet Protocol (IP) telephony session over a local network, comprising:
an IP telephony device;
a packet device to:
receive packets from a remote; and
receive packets from the devices on the local network, configured such that when it receives packets from devices on the local network, the packet device;
changes a source IP address of the packet from the IP address of the device on the local network to the IP address of the packet device, and
verifies that no other devices on the local network are already using the source port, and if another device is using the source port, the packet device assigns a new source port to the packet;
a DHCP server to assign local P addresses to devices on the local network in response to an IP address request in the form of a DHCP packet sent by a device on the local network, the request packet containing in the options field a symbolic name of the device, wherein the local IP addresses are not directly accessible to devices on the remote network;
a NAT device to execute network address translation;
an association device to create an association table from symbolic names of the devices on the network and the local IP addresses associated with the devices; and
an addressing device to determine, based upon the association table, a local destination address of each of the packets received by the packet device by correlating the symbolic name of the device with the device's assigned IP address, and to route each of the packets to the local destination address.

15. The system of claim 14, wherein the packet device is a router.

16. The system of claim 15, wherein the DHCP server is located at the router.

17. The system of claim 15, wherein the NAT device is located at the router.

18. An addressing device to use Dynamic Host Configuration Protocol (DHCP) address assignments to determine a local destination address of a received packet in a Network Address Translation Environment, comprising:

a computer-readable medium; and a computer-readable program code, stored on the computer-readable medium, having instructions which, when executed, cause the addressing device to assign local Internet Protocol (IP) addresses to devices on a local network in response to an IP address request in the form of a DHCP packet sent by a device on the local network, the request packet containing in the options field a symbolic name of the device, execute network address translation, receive remote packets from a remote network, where the local IP addresses are not directly accessible to devices on the remote network, receive packets from the devices on the local network, and change a source IP address of the packet from the IP address of the device on the local network to the IP address of a packet device that receives packets from the devices on the local network, and verify that no other devices on the local network are already using the source port, and if another device is using the source port, assign a new source port to the packet;

utilize an association table created from symbolic names of the devices on the network and the local IP addresses associated with the devices, and determine the local destination address of the packets received by the addressing device by correlating the symbolic name of the device with the device's assigned IP address;

cause the addressing device to determine a symbolic name of a destination address of a device from the packets;

utilize the association table to determine the destination address of the packets; and route the packets to the destination address.

19. The addressing device of claim 18, wherein the addressing device is a router.

20. The addressing device of claim 19, wherein the router includes a DHCP server.

21. The addressing device of claim 19, wherein the router includes a NAT device.

22. The addressing device of claim 18, wherein the remote network is an Internet.

* * * * *